United States Patent [19]

Brugger et al.

[11] Patent Number: 5,719,769
[45] Date of Patent: Feb. 17, 1998

[54] METHOD FOR DETERMINING A TRIGGER THRESHOLD VALUE FOR AN AUTOMATIC BRAKING OPERATION

[75] Inventors: Franz Brugger, Winnenden; Bernd Knoff, Esslingen; Albrecht Eckl, Stuttgart; Hans-Georg Riedel, Pforzeim, all of Germany

[73] Assignee: Mercedes-Benz AG, Germany

[21] Appl. No.: 557,774

[22] Filed: Nov. 13, 1995

[30] Foreign Application Priority Data

Nov. 11, 1994 [DE] Germany .................. 44 40 290.2

[51] Int. Cl.$^6$ ..................................................... B60T 7/12
[52] U.S. Cl. ..................... 364/426.01; 303/113.4; 303/155
[58] Field of Search ................. 364/424.058, 424.082, 364/424.085, 424.087, 424.089, 424.094, 426.01, 426.024; 303/113.4, 155, 125, 114.3, 93, 100, 113.2, 135, 176, 191; 188/353

[56] References Cited

U.S. PATENT DOCUMENTS

| | | | |
|---|---|---|---|
| 5,535,123 | 7/1996 | Rump et al. | 364/426.02 |
| 5,549,369 | 8/1996 | Rump et al. | 303/125 |
| 5,556,173 | 9/1996 | Steiner et al. | 303/3 |
| 5,564,797 | 10/1996 | Steiner et al. | 303/113.4 |
| 5,584,542 | 12/1996 | Klarer et al. | 303/155 |
| 5,590,937 | 1/1997 | Heibel | 303/125 |

FOREIGN PATENT DOCUMENTS

| | | |
|---|---|---|
| 40 28 290 | 1/1992 | Germany . |
| 43 35 940 | 12/1994 | Germany . |
| 43 38 068 | 3/1995 | Germany . |
| 43 38 069 | 3/1995 | Germany . |
| 63-45336 | 9/1988 | Japan . |
| 4-121260 | 4/1992 | Japan . |
| 2 280 718 | 2/1995 | United Kingdom . |
| 2 283 546 | 5/1995 | United Kingdom . |

OTHER PUBLICATIONS

French Search Report dated Apr. 19, 1996.
Search Report from British Patent Office dated 15 Dec. 1995.

Primary Examiner—Kevin J. Teska
Assistant Examiner—Stephen J. Walder, Jr.
Attorney, Agent, or Firm—Evenson, McKeown, Edwards & Lenahan, P.L.L.C.

[57] ABSTRACT

The invention relates to a method for setting a trigger threshold value for an automatic braking operation. When the actuating speed of the brake pedal exceeds a threshold value, automatic braking operation is initiated, and a brake pressure is increased relative to the brake pressure corresponding to the position of the brake pedal. During each brake actuation a relation is formed between the pedal travel of the brake pedal and the derivative of the vehicle deceleration with respect to the pedal travel. A correcting value is defined from this relationship and the threshold value for automatic braking is determined as a function of a preset threshold value and the correcting value.

10 Claims, 3 Drawing Sheets

METHOD FOR DETERMINING A TRIGGER THRESHOLD VALUE FOR AN AUTOMATIC BRAKING OPERATION

BACKGROUND AND SUMMARY OF THE INVENTION

The invention relates to a method for triggering an automatic braking system of a vehicle when the actuating speed of the vehicle brake pedal exceeds a threshold value determined according to the invention.

German Patent Document DE 4,028,290 C1, for example, discloses a system of this generic type in which emergency braking is recognized when the actuating speed of the brake pedal exceeds a threshold value. When this occurs, automatic braking is executed, and a brake pressure is increased relative to the brake pressure corresponding to the position of the brake pedal. The automatic braking operation continues, for example, until the brake pedal reaches its nonactuated position of rest. At the same time, the trigger threshold value must also be matched to the circumstances in the vehicle. The threshold value is therefore set for a specific vehicle type and is the same in all vehicles of this type.

Furthermore, it is known, for example from German Patent Document DE P 43 38 068.9 (not previously published), to adapt the trigger threshold value to the driver's behavior, so that undesirable erroneous triggering of the automatic braking operation is prevented. Here, too, the specific circumstances of the vehicle are not taken into account.

However, on account of different vehicle-specific circumstances, it may happen that, in vehicles of the same vehicle type, the threshold value is not defined correctly in view of the circumstances the vehicle. This results either in needless erroneous triggering or failure to trigger, as the case may be.

The object of the present invention is to provided an improved method for triggering automatic braking operation, in which triggering can be matched to vehicle-specific circumstances, particularly, the response of the brake system and the adhesion between the brake linings and the brake disc or brake drum.

This object is achieved by the method according to the invention in which, during each actuation of the brakes a relation is determined between the travel of the brake pedal and the derivative of the vehicle deceleration with respect to pedal travel. A correcting value is then defined from this relation, and a trigger threshold value for automatic braking is determined from a preset threshold value and the correcting value.

Other objects, advantages and novel features of the present invention will become apparent from the following detailed description of the invention when considered in conjunction with the accompanying drawings.

DETAILED DESCRIPTION OF THE DRAWINGS

Figure 1:
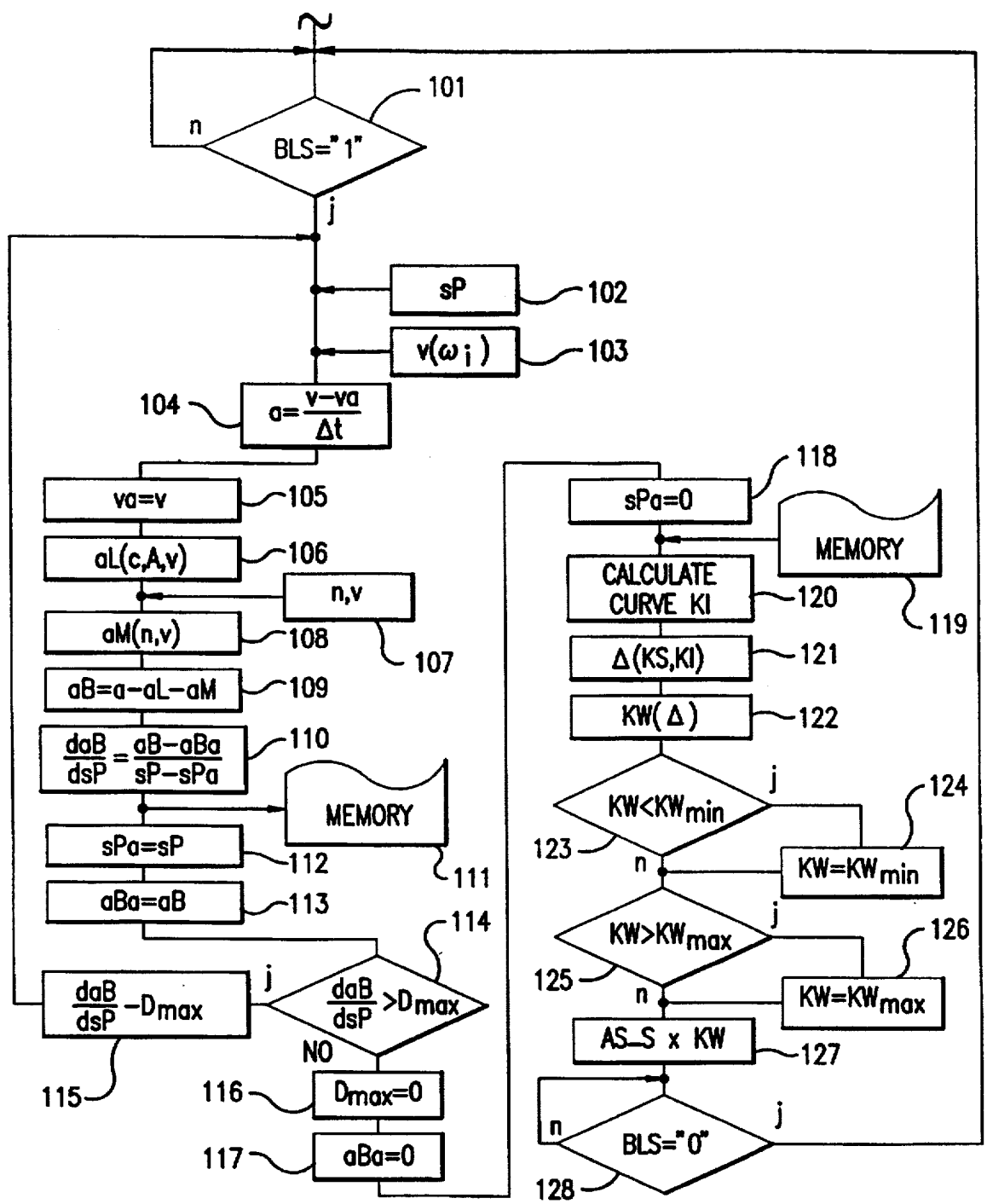
FIG. 1 is a flow diagram which illustrates the method according to the invention.

The method according to the invention, as represented in FIG. 1, is divided into two phases. In the first phase, steps 101 to 118 record braking operations during their occurrence. Steps 119 to 128 in the second phase provide for calculation of a new correcting value KW and a new trigger threshold value AS based on the brake operation parameters recorded during steps 101-118.

The first method phase is initiated at step 101, in which a check is made as to whether there is a brake actuation, based on the position of the brake light switch BLS. When BLS switches from its position "0"—brake lights switched off—into its position "1"—brake lights on—, recording of the braking operation commences. Thereafter, in step 102, the current value of the pedal travel sP is recorded. For this purpose, a quantity representing the pedal travel sP (or linked fixedly to it, such as the travel of a diaphragm separating the chambers of a vacuum booster) is measured. Recording of the diaphragm travel does not necessarily require an additional sensor, since the triggering of an automatic braking operation usually requires the recording of the pedal travel sP. In step 103, a current value of vehicle speed v is entered. Vehicle speed v can be derived, for example, from the wheel rotational speeds $\psi_i$. Processing of the wheel rotational speeds $\psi_i$ and the calculation of the vehicle speed v can be carried out according to the methods known from anti-lock braking systems (ABS).

In step 104, the rate of change of vehicle speed (that is, vehicle deceleration) is calculated from the current value of the vehicle speed v and the value of the vehicle speed va from the preceding cycle. For this purpose, the difference between the two speeds v, va is divided by the cycle time st for the steps 102 to 115. (During the first calculation cycle, the value of the speed of the preceding cycle is undefined. Consequently, for the first cycle there must be a jump (not shown in FIG. 1) back to step 103 after the first recording of a vehicle speed, in order to have two successive values of the vehicle speed v recorded. In this case, the cycle time st between two recordings of the vehicle speed is shortened.)

In step 105, the value for the vehicle speed va of the preceding cycle is then updated by the current value of the vehicle speed v.

In step 106, the deceleration component aL resulting from the air resistance is calculated. In a first approximation, this can be carried out by means of the equation $aL = c + A*v^2$, in which A represents the forepart and c the coefficient of air resistance. The forepart of the vehicle and the coefficient of air resistance can be preset as values specific to the type of vehicle.

In step 107, engine speed n and vehicle speed v are entered. (The corresponding values can be taken from other control units.) The deceleration component aM resulting from braking torque of the engine is then determined in step 108, from a characteristic diagram stored in a computer memory, as a function of the engine speed n and vehicle speed v.

In step 109, the vehicle deceleration aB resulting from the actuation of the brake is then calculated according to the equation $aB = a - aL - aM$.

In step 110, a first approximation of the derivative daB/dsP of the deceleration aB with respect to the pedal travel sP resulting from the actuation of the brake (referred to hereinafter simply as the "derivative") is formed by taking a difference quotient, for which purpose the values of the deceleration aBa and the pedal travel spa of the preceding cycle are used.

In step 111, the derivative daB/dsP and the pedal travel sP are stored, and in steps 112 and 113 the values of the pedal travel sPa and of the vehicle deceleration aBa of the preceding cycle are updated by the new values.

Next, in step 114 it is determined whether the derivative daB/dsP exceeds the previous maximum value Dmax (stored in step 115 of previous cycles). If it does, then it may be concluded that daB/dsP is still increasing. Accordingly, in step 115 the current value of the derivation daB/dsP is stored as the new value for the maximum Dmax, and the process returns to step 102 for a new cycle.

When the derivative daB/dsP no longer exceeds the previously stored maximum in step 114, recording of the derivative daB/dsP is terminated. In steps 116 to 118, the values of aBa and sPa are initialized by resetting to zero for the next brake actuation. The first phase is thereby terminated and processing proceeds to the second part.

Figure 2:
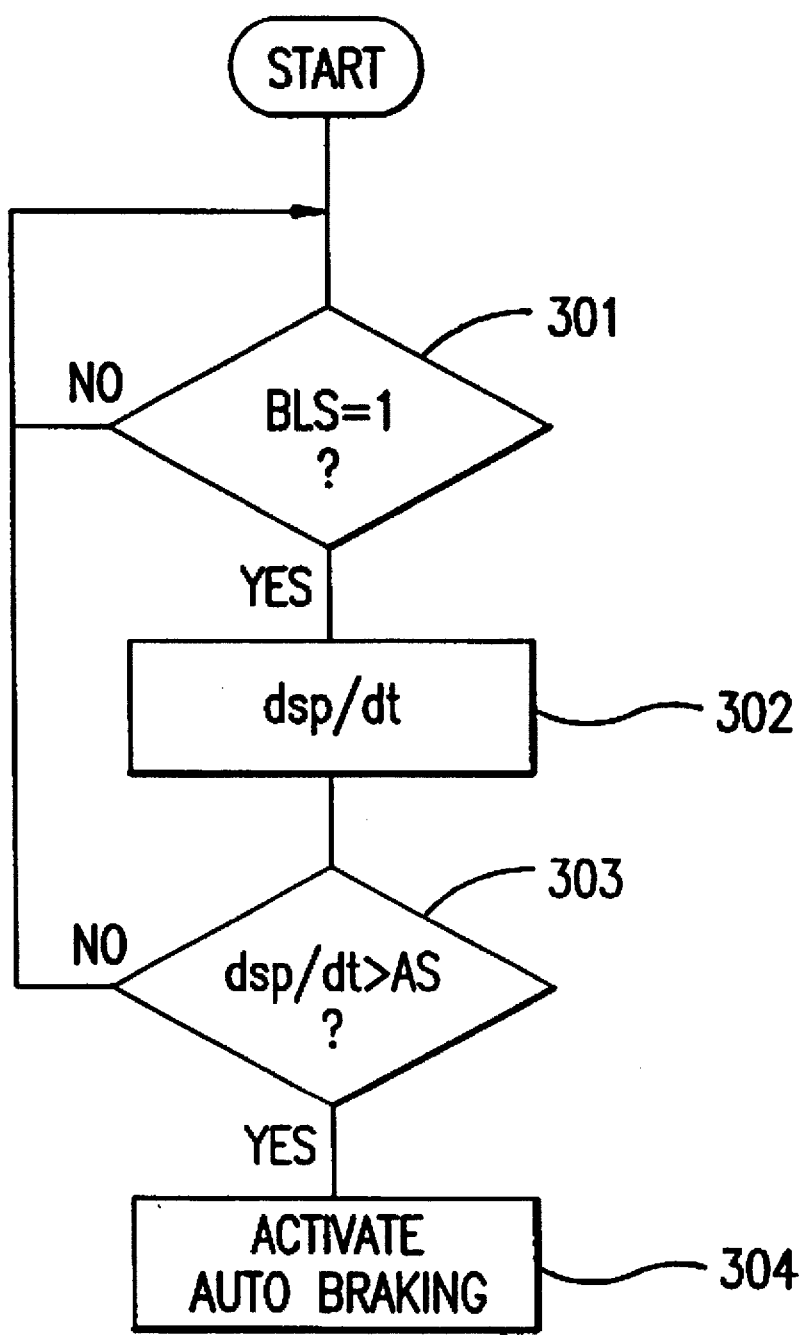
FIG. 2 shows the rate of change of vehicle deceleration according to the pedal travel, relative to the pedal travel of the brake pedal.

The values stored in step 111, including the values of the derivative daB/dsP and the associated pedal travel sP stored during preceding brake actuations, are entered again in step 119. In step 120, a vehicle-specific curve RI of the derivative daB/dsP is determined as a function of the pedal travel sP from the values stored for several braking operations (for example, by the of least squares method). In step 121, the deviation Δ of the curve KI relative to a desired curve KS (preset for the vehicle type) is then determined. (An example of how a deviation Δ can be determined is illustrated in FIG. 2, which is discussed in more detail hereinafter.) In step 122, the correcting value KW resulting from the deviation A is determined in a manner described below.

In steps 123 to 126, the correcting value is limited to a specific range within fixed upper and lower limits. That is, the correcting value cannot be less than a minimum correcting value $KW_{min}$ (for example, 0.8) and cannot exceed a maximum correcting value $KW_{max}$ (for example, 1.5). For this purpose, a check is made, in step 123, as to whether the determined correcting value KW is lower than the minimum correcting value $KW_{min}$. If so, in step 124 the correcting value KW is set to the minimum correcting value $KW_{min}$. Similarly, check is made, in step 125, as to whether the determined correcting value KW is higher than the maximum correcting value $KW_{max}$. If so, in step 126 the correcting value KW is set to the maximum correcting value $KW_{max}$.

In step 127, the vehicle-specific trigger threshold value AS is now calculated by multiplying the preset threshold value S for triggering automatic braking for the particular vehicle type, by the correcting value KW. The preset threshold value S may be permanently preset, or it may be determined as a function of the driver's behavior in a known manner.

Step 128, which then follows, is a standby loop which ensures that a new determination of the correcting value can take place only when the next brake actuation occurs. For this purpose, it is determined whether the brake actuation which resulted in the preceding determination of the trigger threshold value AS is terminated, by a check as to whether the stop-light switch BLS has the value "0".

FIG. 2 is a flow chart which shows the process for activating automatic braking using the threshold value (AS) determined by the process of FIG. 1. When it is determined in step 301 that the brake light switch is activated, indicating an application of the vehicle brakes, the actuating speed of the vehicle brake pedal is determined in step 302 and compared with the threshold value (AS) in step 303. If the action speed exceeds the threshold, automatic braking is activated in step 304. If not, processing returns to step 301.

Figure 3:
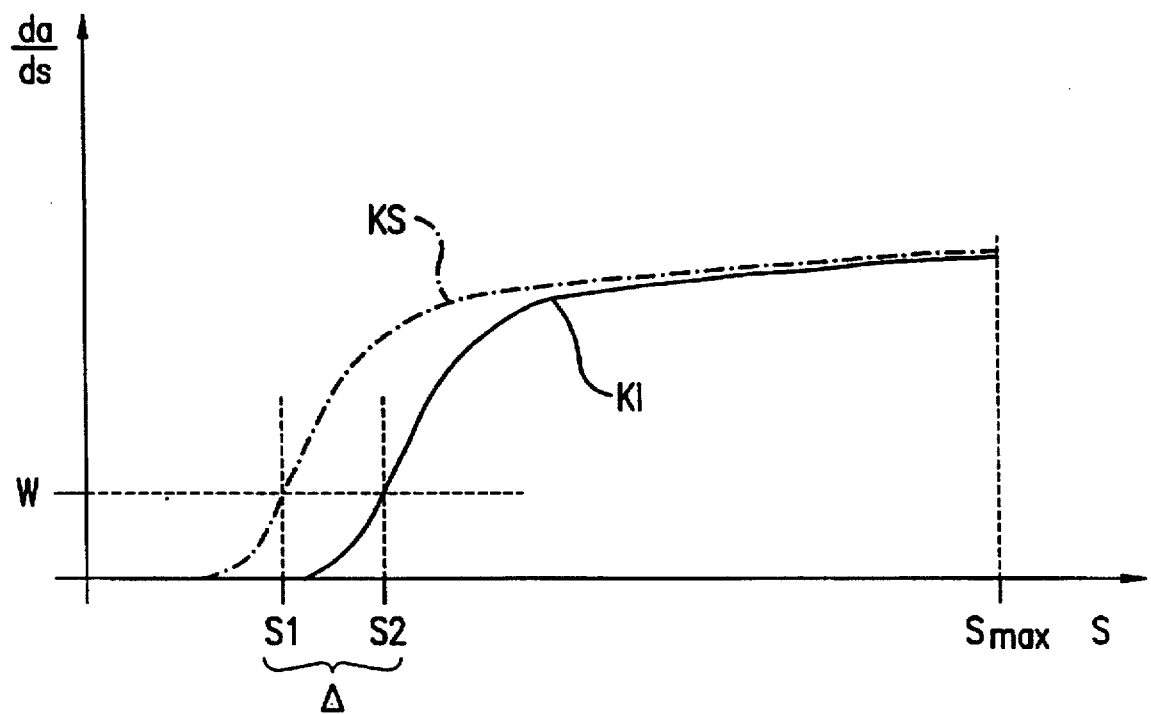
FIG. 3 is a flow diagram which shows the process of activating automatic braking using the threshold value calculated according to FIG. 1.

FIG. 3 shows an example of the curve KI of the derivative daB/dsP, plotted against the pedal travel sP, and of a desired curve KS preset specifically according to the vehicle type. It can easily be seen that the curve KI in this example is displaced relative to the desired curve RS in the direction of greater pedal travels sP. In order to find the difference between the curves, for a preset value W of the derivative, the associated ordinate values S2 and S1 of the curve KI and desired curve KS, respectively, are determined. The difference between the two ordinate values S1 and S2 is then related to the maximum pedal travel $sP_{max}$ to derive the deviation Δ, according to the equation $\Delta = (S2-S1)/sP_{max}$.

The correcting value KW can be calculated from the deviation Δ by means of a preset function, for example, a linear relationship. In the instance shown, the ordinate value S2 is higher than the ordinate value S1, indicating that the brake-pressure build-up is delayed relative to the desired behavior of the brake system. It follows that for the pedal actuation, longer pedal travels and also higher actuation speeds are achieved by means of lower forces. In this case, in order to avoid excessively frequent triggering of automatic braking, the trigger threshold value AS must be higher than the threshold value S. The factor KW is therefore greater than 1. If the curves KI and KS are identical, the correcting value is 1. If the ordinate value S2 is lower than the ordinate value S1, then values lower than 1 must be taken as a correcting value. In order to avoid excessive displacements of the trigger threshold, the correcting value is restricted, for example, to an interval of between 0.8 and 1.5, as noted previously.

As a further measure of the difference between the two curves RI, RS, for example the integral of the enclosed area between the curves RI, RS could be formed numerically.

In the procedure described, the vehicle mass is recorded only as an indirect influencing quantity in relation to the deceleration behavior of the vehicle. Its direct influence on the vehicle behavior is disregarded. At the same time, for example in vehicles with air suspension, it is possible in a simple way to obtain a measure of the current vehicle weight from the operating pressure required for the air suspension. Its influence on the deceleration behavior of the vehicle can thus be taken into account directly as a further deceleration component.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for triggering a vehicle automatic braking operation in which a brake pressure is increased relative to a brake pressure that corresponds to position of the brake pedal, when the actuating speed of the brake pedal exceeds the trigger threshold value, said method comprising the steps of:

measuring pedal travel of a vehicle brake pedal and determining vehicle deceleration during actuation of vehicle brakes;

determining a derivative of vehicle deceleration with respect to brake pedal travel, based on measured values of pedal travel and deceleration;

determining a vehicle specific correction value as a function of a relationship between said pedal travel and said derivative of vehicle deceleration;

determining a triggering threshold value for automatic braking based on a preset threshold and said vehicle specific correction value; and triggering automatic braking whenever actuation speed of said brake pedal exceeds said threshold value.

2. Method according to claim 1, wherein the vehicle deceleration resulting from actuation of the brake is determined from measured wheel rotational speeds.

3. Method according to claim 2, wherein said step of determining the deceleration resulting from actuation of the brake comprises the further steps of:

measuring actual vehicle deceleration based on measured wheel rotational speeds;

determining deceleration components attributable forces other than actuation of the vehicle brake; and subtracting said deceleration components from said actual deceleration.

4. Method according to claim 3, wherein at least vehicle deceleration resulting from air resistance is taken into account in the deceleration components.

5. Method according to claim 3, wherein at least vehicle deceleration resulting from drag torque of the engine is taken into account in the deceleration components.

6. Method according to claim 3, further comprising the steps of:

comparing said curve of the derivative of vehicle deceleration with a predetermined desired curve; and determining said correcting value as a function of a deviation of said curve of the derivative of vehicle deceleration from said desired curve.

7. Method according to claim 6, wherein a new correcting value is determined after each braking operation.

8. Method according to claim 1, wherein a new correcting value is determined after each braking operation.

9. Method according to claim 1, wherein said step of determining a vehicle specific correction value comprises the further steps of:

storing determined values of said derivative of vehicle deceleration in a memory for a plurality of consecutive braking operations; and determining a curve of the derivative of vehicle deceleration as a function of pedal travel based on values stored in said memory.

10. Method according to claim 1, wherein:

the trigger threshold value is determined by multiplying the preset threshold value by the correcting value; and the correcting value is limited to an interval of between 0.8 and 1.5.

* * * * *